(No Model.)
W. LACHLAN.
DEVICE FOR CONNECTING THE ELEMENTS OF SECONDARY BATTERIES.
No. 296,849. Patented Apr. 15, 1884.
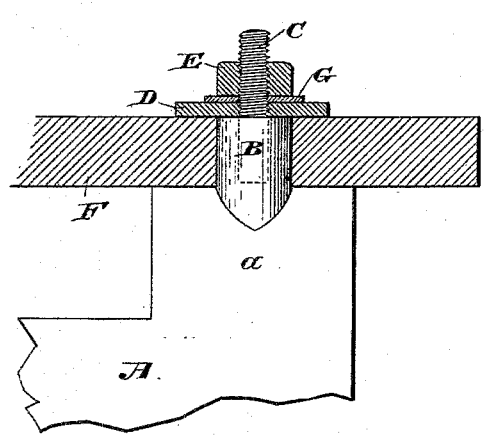
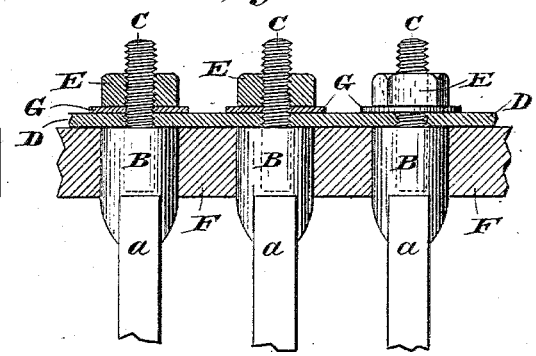
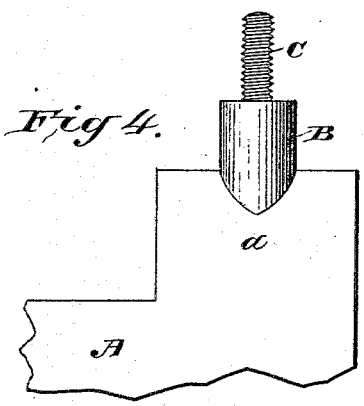
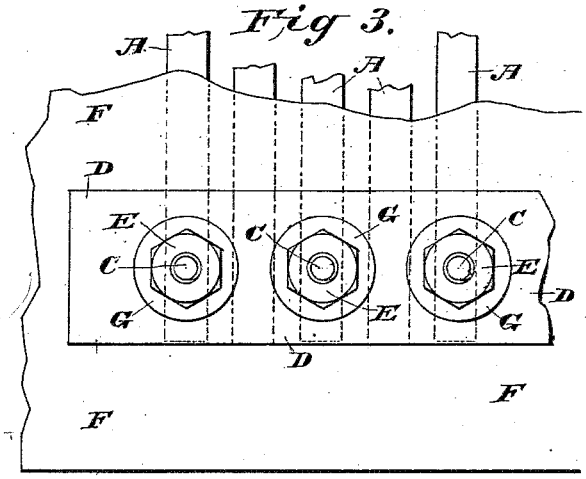
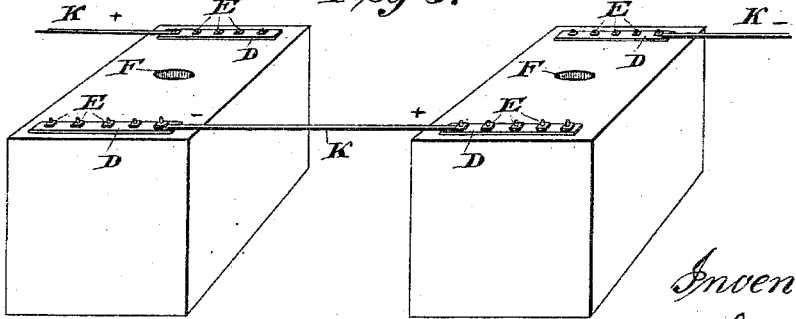
Attest:
C. J. Hedrick
Philip Lowne
Inventor:
William Lachlan
by A. Pollok
his atty.

United States Patent Office.

WILLIAM LACHLAN, OF LONDON, ENGLAND, ASSIGNOR TO THE LIGHT AND FORCE COMPANY, OF NEW YORK, N. Y.

DEVICE FOR CONNECTING THE ELEMENTS OF SECONDARY BATTERIES.

SPECIFICATION forming part of Letters Patent No. 296,849, dated April 15, 1884.

Application filed January 23, 1883. (No model.)

*To all whom it may concern:*

Be it known that I, WILLIAM LACHLAN, of London, England, have invented a new and useful Improvement in Devices for Connecting Elements of Secondary Batteries, which improvement is fully set forth in the following specification.

This invention has reference to the means for connecting the electrode of galvanic batteries, and specially of secondary or polarization batteries, with exterior conductors, for connecting the electrodes of the same cell or of different cells with each other or with other apparatus. The object is to make a durable and electrically good connection which can be readily and economically made. To this end a pin or stud made of a metal which is a good conductor of electricity, preferably copper or alloy thereof, is fixed or partly embedded in the electrode or battery-plate by casting or welding. The electrodes of secondary batteries are ordinarily made of lead, or have as a foundation a body of that material. The said electrodes are or may be made by casting, and the pin or stud is preferably fixed therein in the manufacture of the electrode. The pin or stud, of copper, brass, or gun-metal, having the portion which is to be secured in the electrodes tinned in order to make a close joint between the copper or its alloy and the lead, is placed with the tinned portion projecting into the mold. The molten lead, being run in, sets or hardens around the pin or stud and holds it firmly. A plain or smooth pin or stud, or one of other suitable shape, may be used; but preferably a screw-stud is employed, it being threaded as well on the part which is embedded in the material composing the electrode as the projecting part. It may, of course, have only the projecting part or only the embedded part threaded. While it is most advantageous to unite the pin or stud to the electrode in casting the latter, and while this manner of proceeding embraces the invention in its most complete form, it is obvious that a lug could be cast around the pin or stud and on an electrode; also, that the pin could be surrounded with the metal sheet, which could be welded to and around the pin or stud.

The invention therefore comprises, broadly, the permanent attachment of the connecting pin or stud of good conductivity with the electrode or body thereof by casting or welding, and also, specifically, the particular constructions or proceedings above indicated. Of course the pin or stud could be secured to an electrode of lead alloy or of other fusible metal or metallic compound in the manner indicated for lead. The exterior conductor is best connected with the screw pin or stud by means of a nut which clamps the conductor between itself and an opposing surface, with or without the interposition of a washer. This combination forms part of the invention.

The invention further comprises the use of flat connecting-strips under the nuts or washers, also the particular shape of plate, and the combination of the electrodes with the cover of the retaining-vessel, as hereinafter indicated.

In the accompanying drawings, which form a part of this specification, Figures 1 and 2 are views in section, showing the connection of the electrodes with an exterior conductor and with the cover of the cell; Fig. 3, a plan; Fig. 4, a partial view in elevation of one of the electrodes, and Fig. 5 a perspective of a pair of cells connected in tension.

A represents the electrodes or battery-plates; B, lugs cast thereon; C, the connecting pins or studs; D, conducting-strips connecting the electrodes; E, nuts; F, cover of cell; G, washers, and K strips for connecting the cells with each other and with other apparatus.

To affix the connecting pin or stud C in the battery electrodes or plates A, the pin or stud, of brass, copper, or gun-metal, is placed in the mold in such a manner that the molten lead or other metal composing the electrode shall adhere to it when cool. The said stud or pin C is screw-threaded, and tinned on the portion that is required to be attached to the lead plate. The lead plate or element, when drawn from the mold, will therefore resemble Fig. 4.

To unite the several elements in a secondary battery with the above-mentioned device, holes are bored in the cover or lid F, corresponding to the lugs B, and sufficiently large to pass the latter through them. Over the several pins or studs C, which will protrude beyond the cover or lid, a copper, brass, or gun-metal plate, D, is placed, and this plate is held in position so as to render the contacts absolutely perfect by a copper, brass, gun-metal, phosphor-bronze, or iron nut, E, with a thin washer, G, of the same metal, beneath.

In order to diminish the weight of the plates, elements, or electrodes A, they are provided with projecting pieces $a$, on which the lugs B are cast. It is obvious, however, that the projections $a$ need not be left on the plates or electrodes A, but that the lugs may be cast directly upon the main body of the electrode or plate, if desired.

The electrodes in Fig. 2 are all of the same name or polarity. Those of opposite name or polarity would be interleaved between them, as shown in Fig. 3.

Instead of using a flat strip, as shown at D, for connecting the electrodes, a round conductor or wire could be employed, the clamping devices being modified as deemed suitable.

No special terminal or binding-post is necessary in order to connect cells having the improved connecting devices with one another or with other apparatus, such as dynamo-electric machines, or other electric generators, motors, lights, and the like. The conductor K may be clamped under the nut E of one or more of the electrodes.

It is obvious that modifications may be made in the details of construction without departing from the spirit of the invention, and portions of the same may be separately used, if desired.

I am aware that heretofore the zinc electrodes of certain gravity-batteries have been provided with a screw-connecting pin embedded therein by casting, and those of others with a screw-cup soldered into a recess in the zinc; and I am further aware that the zincs of Leclanché cells have been provided with a screw-threaded projection of smaller diameter than the body of the zinc and made integral with the latter. These and analogous devices are not included in this invention.

Having now fully described my said invention and the manner of carrying the same into effect, what I claim is—

1. An electrode comprising a plate having at one edge a lug of greater thickness than the body of the plate and a pin or stud partly embedded in said lug, substantially as described.

2. An electrode comprising a plate with a projecting piece and a pin or stud partly embedded in a lug cast on said projecting piece, substantially as described.

3. The lead electrodes of a secondary battery, provided with a partly-embedded pin or stud of brass, copper, or gun-metal, said pin or stud having the embedded portion tin-coated and secured in the lead by casting, substantially as described.

4. The combination of the perforated cover, the electrodes with lugs projecting through said cover, the pins or studs partly embedded in said lugs, the nuts, and the connecting-strips, substantially as described.

5. The combination, with a series of plates constituting the electrodes of a cell of secondary battery, each plate having a lug projecting through a hole in the cover of said cell, and a threaded pin of copper or copper alloy embedded in said lug, of conductors clamped by nuts on said pins and connecting alternate electrodes with each other, and the two sets thus formed with the poles of other cells or apparatus, substantially as described.

6. In combination with the plates of a secondary battery provided with lugs and screws set therein, the metal connecting-strip having perforations, and the nuts for binding the said strip, substantially as described.

In testimony whereof I have signed this specification in the presence of two subscribing witnesses.

WILLIAM LACHLAN.

Witnesses:
ELIOT B. WHITING,
P. B. VAN NESS.